(12) United States Patent
Dick

(10) Patent No.: US 7,581,901 B2
(45) Date of Patent: Sep. 1, 2009

(54) WAVE ENERGY CONVERTER

(75) Inventor: William Dick, Blessington (IE)

(73) Assignee: Wavebob Limited, Kildare (IE)

( * ) Notice: Subject to any disclaimer, the term of this patent is extended or adjusted under 35 U.S.C. 154(b) by 650 days.

(21) Appl. No.: 11/033,732

(22) Filed: Jan. 11, 2005

(65) Prior Publication Data

US 2005/0123353 A1    Jun. 9, 2005

Related U.S. Application Data

(63) Continuation of application No. 10/311,091, filed as application No. PCT/IE01/00082 on Jun. 14, 2001, now Pat. No. 6,857,266.

(30) Foreign Application Priority Data

Jun. 16, 2000    (IE) ............................... S2000/0493

(51) Int. Cl.
*F03C 1/00*    (2006.01)
*E02B 9/08*    (2006.01)

(52) U.S. Cl. .......................... 405/76; 60/398; 417/331

(58) Field of Classification Search ................. 417/330, 417/331, 333; 60/398; 290/53; 405/75, 405/76
See application file for complete search history.

(56) References Cited

U.S. PATENT DOCUMENTS

| | | | |
|---|---|---|---|
| 4,203,294 A | 5/1980 | Budal et al. |
| 4,453,894 A | 6/1984 | Ferone et al. |
| 4,883,411 A | 11/1989 | Windle |
| 5,701,740 A | 12/1997 | Tveter |
| 5,842,838 A | 12/1998 | Berg |

FOREIGN PATENT DOCUMENTS

| | | |
|---|---|---|
| DE | 41 13 410 | 10/1992 |
| WO | WO 99/22137 | 5/1999 |
| WO | WO 99/28623 | 6/1999 |
| WO | WO 00/08334 | 2/2000 |

*Primary Examiner*—Tara Mayo-Pinnock
(74) *Attorney, Agent, or Firm*—Holland & Hart LLP

(57) ABSTRACT

A point absorber wave energy apparatus includes first and second devices, the first device being a surface float and the second a submerged body. Linkages are provided between the two devices so that energy resulting from relative motion between the two devices can be extracted. The apparatus may be tuned to the prevailing conditions by enabling the submerged body to trap volumes of the surrounding liquid.

12 Claims, 8 Drawing Sheets

WAVE ENERGY CONVERTER

This application is a continuation of U.S. patent application Ser. No. 10/311,091 filed Dec. 12, 2002, now U.S. Pat. No. 6,857,266 B2, which is the National Stage of International Application No. PCT/IE01/00082, filed Jun. 14, 2001, which claims priority from Ireland patent application S2000/0493, filed Jun. 16, 2000.

The invention relates to a point absorber wave energy converter, preferably comprising two or more heaving buoys floating on the surface each rigidly linked to one or more deeply suspended vessels or bodies, the relative movement between the two bodies being utilised to generate energy. The term wave or wave motion as used herein refers to both waves on a surface of a liquid and swell in a body of liquid.

BACKGROUND

Quest for Economic Sources of Renewable Energy

The development of a practical wave energy converter has been the focus of attention from a number of engineers and theoreticians over the past twenty five years. Theoretical understanding of sea waves and technical expertise in related marine engineering has gained immeasurably from the off-shore oil and gas industries during the same period. Growing concern with global climate change has led to an increased sense of urgency in the quest for commercially viable renewable energy sources.

The Size of the Wave Energy Resource

The potential of wave energy has been recognised for many years. The size of this resource has been estimated to be 219 gigawatts along the coasts of the European Union, or more than 180 terawatt hours each year. The wave power off the west coasts of Ireland and Scotland, where the winter resource is approximately twice that available during summer months, ranks with the highest levels in the World.

The Offshore Resource is Greater

Wave energy is lost by friction with the sea bottom as the sea becomes shallow (water depths of half a wavelength or less). This is most pronounced where wavelengths tend to be long, as off the NW coast of Europe. On or close to the shore the availability of this already attenuated resource is greatly diminished by the lack of physically suitable sites and restrictions imposed by planning controls.

Development of Wave Energy Converters.

Research and development into wave energy converters (WECs) over the past twenty-five years, plus the knowledge and practical experience gained from the off-shore oil and gas industries, has now reached a stage where robust and effective wave energy converters with installed capacities of one megawatt and greater are being developed.

Categories of Wave Energy Converters

The wave energy resource may be split into three broad categories, based on where the energy from waves may be recovered:

1. in the open sea, i.e. offshore 2. on or close to the shore line, i.e. on-shore or inshore 3. outside the normal area of breaking waves but not in the deep ocean, i.e. near shore.

The very large number of devices and concepts proposed to date has been classified and described in summary form for the Engineering Committee on Oceanic Resources by the Working Group on Wave Energy Conversion (ECOR draft report, April 1998). This follows a similar classification based on the intended location, i.e. offshore, near shore to offshore, and on-shore.

Wave Energy Converters (WECs) may also be classified in different ways according to their operating principle and the ways in which they react with waves. In terms of practical application, only a very few types of device are presently, or in the recent past have been, in use or under test.

A significant fraction of the present generation of WEC devices incorporate an Oscillating Water Column (OWC). OWC devices are typically those where the wave is confined in a vertical tube or a larger chamber and, as it surges back and forth, drives air through a power conversion device typically an air-turbine. Megawatt-scale OWC devices are now at an advanced stage of development. One such device, built in a rocky gully on the western shore of Pico in the Azores, is a reinforced concrete chamber partly open at one side below the waterline to the action of the waves. A similar but slightly smaller device, the LIMPET, has been installed on the cliff face of Islay in Scotland. These two installations would seem to be the best-developed and perfected WEC systems of this size currently available. It is, however, unlikely that any one such installation will have an installed capacity greater than two megawatts and the number of suitable sites has to be extremely limited.

The present invention relates to an apparatus that may be of at least a comparable size, and capable of being deployed offshore and in large arrays. It is of a class of WEC's known as Point Absorbers.

Point Absorbers

Point absorbers are usually axi-symmetric about a vertical axis, and by definition their dimensions are small with respect to the wavelength of the predominant wave. The devices usually operate in a vertical mode, often referred to as 'heave'. Typically, a surface-piercing float rises and falls with the passing waves and reacts against the seabed or a taut mooring. As such they are capable of absorbing energy arising from changes in the surface level rather than from forward motion of breaking seas. The theoretical limit for the energy that can be absorbed by a single isolated, heaving, axi-symmetrical point absorber has been shown to depend on the wavelength of the incident waves rather than the cross sectional area of the device, i.e. from the wavelength divided by $2\pi$. Thus the wavelength is a critically important criterion, resulting in the attraction of locating the point absorber devices well outside the region of breaking waves, and where they will be open to long wavelength ocean swell or 'heave'.

Point absorbers may react against the seabed (therefore necessarily sited in relatively shallow water, usually near-shore), or be floating and react against the inherent inertia of one of its components.

Small-scale practical point absorbers such as fog horns and navigation buoys, both of which may incorporate OWCS, have been in use for many years. Typically these have a power of a few hundred watts.

Self-Reacting Heaving Buoy Point Absorbers.

There have been several attempts to develop wave energy converters based on the self-reacting heaving buoy principle. One such example is a heaving buoy which reacts against an inertial plate suspended below. This concept has been described and analysed by Berggren, L. and Johansson, M., Hydrodynamic coefficients of a wave energy device consisting of a buoy and a submerged plate. Applied Ocean Research, 0141-1187/92/05.00 and by Falnes, J., Wave-energy conversion through relative motion between two single-mode oscillating bodies (OMAE, Lisbon, Portugal, 5-9 Jul. 1998).

A second variation of the heaving buoy principle is described in an international patent application, WO 97/41349. In this, a single heaving buoy reacts against a column of water trapped in a cylinder suspended vertically below and open at either end, by means of a wide piston moving reciprocally within the cylinder. The column of water moved by the piston acts as an inertial mass; this arrangement is known as an accelerator tube. Similar technology is known and described in U.S. Pat. No. 4,773,221.

In these illustrative examples and all such self-reacting heaving buoy systems, there are essentially three basic components: a heaving buoy on the surface, some form of reaction device suspended below (an inertial plate, accelerator tube, etc.) and a load resistance or power take-off placed between them.

Latching and Phase Control

It is also known to use a principle of latching the phase control of a heavy body The principle of latching a heaving (vertically oscillating) body in irregular waves having been described by Budal and Falnes in 1978 British Patent No. GB 1587344.

Their idea was to force the phase of a heaving float to follow that of the waves, which had a significantly lower natural frequency (longer period). In this way greatly amplified motions and correspondingly larger power levels were achieved.

They disclose the holding of the heaving body at the top or bottom of its cycle by a hydraulically operated latching mechanism (functioning as a parking brake), locking the heaving float to a long rod attached to the bottom of the wave channel. It was then released so that it would resume motion in direction and in phase with the wave. Further theoretical analysis has been completed by various researchers. Two forms of such 'phase control' are now recognised, i.e. latching as described and continuous control which may be applied throughout the cycle and may involve power being returned to the heaving device.

Variable Buoyancy Apparatus

A further development in self-reacting point absorbers incorporates a three-body point absorber comprising a surface float, a submerged variable buoyancy and an inertial mass. Such a device is known and described in our corresponding international application WO 99/28623. Such a device does not provide an optimum transfer of energy from the passing waves to the converter.

Therefore is therefore a need for an improved wave energy conversion device.

OBJECT OF THE INVENTION

It is an object of this present invention to provide an improved device for extracting energy from waves or a swell in a body of liquid.

SUMMARY OF THE INVENTION

Accordingly the invention provides a wave energy conversion apparatus for harnessing energy from wave motion comprising:

at least two devices, each device comprising a surface float and/or at least one submerged body below the surface,
linkages between the at least two devices, and wherein the at least two devices are adapted to move relative to one another in response to passing waves or swell in the body of liquid, and which relative movement between the at least two devices may be harnessed by the linkages between the at least two vessels or devices.

Desirably each of at least two devices comprises a surface float rigidly connected to at least one submerged body below the surface float.

The movement between the at least two devices preferably effects an energy generation which is harnessed by the linkages.

By the term rigidly connected is meant that the connection between the surface float and the at least one submerged body is sufficiently rigid to transmit tension and compression forces.

The at least one submerged body is preferably submerged at a depth below the surface that is a significant fraction of the length of the prevailing wavelengths of wave or swell in the body of liquid.

The at least one submerged body is preferably adapted to entrap volumes of the surrounding liquid or may alternatively or also in part entrap or contain airspaces or buoyancy devices.

The surface floats are preferably of a size and weight sufficient to ensure that they remain partially submerged in the water under normal wave or swell conditions.

By the term surface float is meant a surface-piercing body normally at least partially submerged, wherein at least part of the float normally pierces or projects above the level of the fluid in which the float is present.

By normal conditions is meant conditions that are typical for prevailing weather conditions and wave/swell size in the area of deployment of the apparatus.

Preferably each device comprising a surface float, submerged body or vessel and entrapped liquid has an overall mass, virtual mass and dimensions such that it will either tend to have a natural frequency of oscillation along its vertical axis that is close to the dominant frequency of the surface wave or have a means to alter its natural frequency to match that of the prevailing wave climate.

By virtual mass is meant minimal gravitational weight and refers to a body that provides high hydrodynamic ballast or inertial mass with which there will be 'added mass' associated with its movement through the fluid. This desirably may be an enclosed vessel entrapping the liquid in which it is immersed, or alternatively a partially enclosed vessel or a submerged horizontal flat plate. The virtual mass is intended to provide a resistance to the acceleration of the rigidly linked surface float. It would preferably be smooth and streamlined to reduce drag and may enclose buoyancy to minimise gravitational weight.

The apparatus may additionally comprise adjustment means by which the entrapped volume of the submerged vessels may be adjusted by, for example, adjusting the volume of liquid entrapped in the submerged vessel(s).

The linkages are adapted to operate a power take off system which may typically be hydraulic and driving an electric alternator. The linkages are preferably arranged to allow several degrees of freedom of movement, and thus to collect additional power from relative movements arising from pitching and rolling as well as from vertical heave.

Preferably, the apparatus includes tuning and control systems linked to probes or detectors or an operating console either onboard and/or remote from the at least two devices.

The apparatus may additionally comprise latching and/or phase control means adapted to assist and optimise the oscillation, amplitude and relative motion of linked devices in varying or heavy sea conditions. This may be effected by using hydraulics or air springs to freeze or temporarily dampen the movements of the devices and or to return power to the apparatus at certain stages in the cycle.

The apparatus may also include mooring systems that maintain the complete apparatus in a position that is consistent with statutory requirements and not significantly inhibit its efficient operation.

In addition to the aforementioned power take-off linkages, linked devices may also have elastic links or chains or shock absorbers or similar adaptations to absorb excessive relative movements in heave or surge or pitch that may be caused by breaking seas in storm conditions; such elastic links or chains would normally be slack and may be weighted.

Other advantages and features of the present invention will become apparent from the following detailed description, the accompanying drawings, and the appended claims.

DETAILED DESCRIPTION OF THE DRAWINGS

Figure 1:
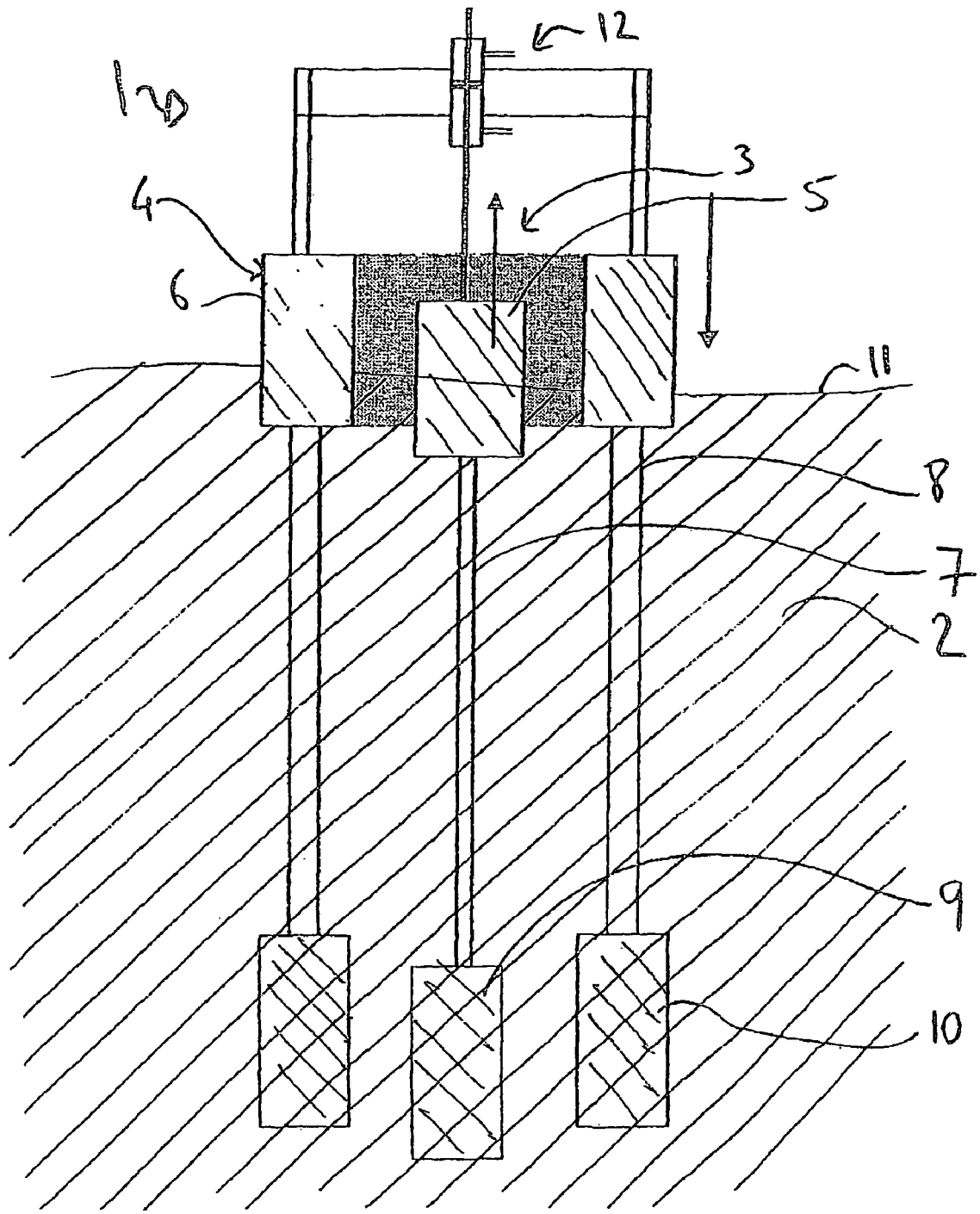
FIG. 1 is a schematic showing the principle of operation of an apparatus of the present invention under wave conditions, with the floats and associated submerged bodies oscillating out of phase with one another.
Figure 2:
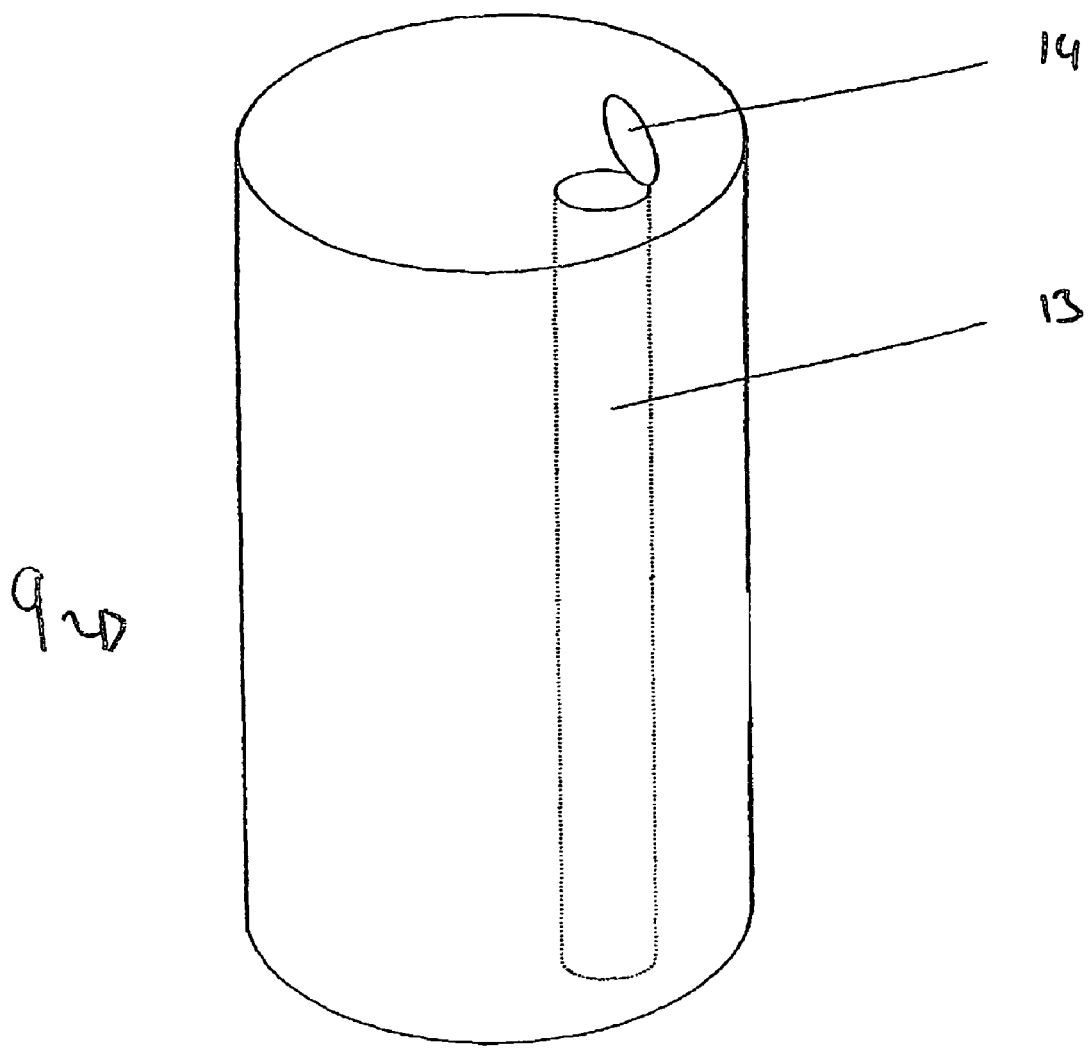
FIG. 2 is a schematic showing one possible arrangement suitable for adjusting the virtual mass of the submerged body of the device of the present invention.

FIGS. 1 and 2 show an apparatus 1 for harnessing energy from waves or swell in a body of liquid 2 in accordance with one embodiment of the present invention. It comprises two devices: an inner device 3, and an outer device 4. Both the inner and outer devices comprise surface floats 5, 6 rigidly connected by means of stiff rods 7, 8 or other suitable means, to respective submerged bodies 9, 10 below the surface. The surface floats 5, 6, may preferably incorporate watertight bulkheads. The submerged bodies 9, 10 are preferably adapted to entrap volumes of the surrounding liquid or may alternatively or also in part entrap or contain airspace's or buoyancy devices. The submerged bodies 9, 10 may be considered to have a virtual mass: by the term virtual mass is meant minimal gravitational weight and refers to a body that provides inertial mass and hydrodynamic ballast or added mass. This may preferably be an enclosed vessel, but also suitably a partially enclosed vessel or a submerged horizontal flat plate or some combination of these. The virtual mass is intended to provide a resistance to the acceleration of the linked surface float.

In the view shown in FIG. 1 the surface level 11 is not flat, i.e. comparable to a passing swell, and the two devices are adapted to move relative to one another in response to the passing waves or swell in the body of liquid. Preferably, the overall mass, virtual mass and dimensions of each device comprising surface float, submerged body or vessel(s) and entrapped liquid is such that each will tend to have a natural frequency of oscillation along its vertical axis that is close to the lower end of the range of frequencies that corresponds to the bulk of the passing wave energy. The actual frequency of oscillation of the linked devices may be increased above their natural frequency by means of phase control systems, for example by hydraulic means, so that the apparatus tends to move in phase with the immediate wave climate. The natural frequencies of the two linked devices may be further adjusted by altering the amount of the respective virtual mass (i.e. inertial mass and added mass) to which each is attached. These virtual masses resist the acceleration and hence rate of response of the linked floating body to the driving forces caused by the passing wave in both rising and sinking motions. By altering these virtual masses it is possible to arrange that the two linked devices tend to oscillate with differing phase angles. The amount of difference may typically be a quarter of the frequency of the dominant wave. This relative movement between the two devices 3, 4 effects an energy transfer which may be harnessed by linkages 12 between the two devices 3, 4.

It will be appreciated by those skilled in the art that any combination or number of submerged bodies may be utilised.

As shown in FIG. 2, using the example of one submerged body 9, the submerged bodies 9, 10 may additionally comprise adjustment means by which the inertial mass of the submerged vessels may be adjusted by, for example, adjusting the volume of liquid entrapped in the submerged vessel(s). The submerged body may include a cylindrical compartment 13 running the length of the submerged vessel, but sealed off from the remaining portion of the sealed vessel. When open at both ends the cylindrical compartment will "hold" no liquid, and as such can be considered to have no inertial mass. By activation of a valve 14, which may be at the top and/or bottom of the cylindrical vessel or above by means of a narrow bore extension open to the atmosphere via surface float it is possible to vary the entrapped mass contained within the compartment 13. The submerged body may have a plurality or none of such compartments contained therein. This method of adjustment can have the additional benefit of adjusting the added mass associated with the submerged body by effectively altering its cross-sectional area in the direction of the heaving movement.

Figure 3:
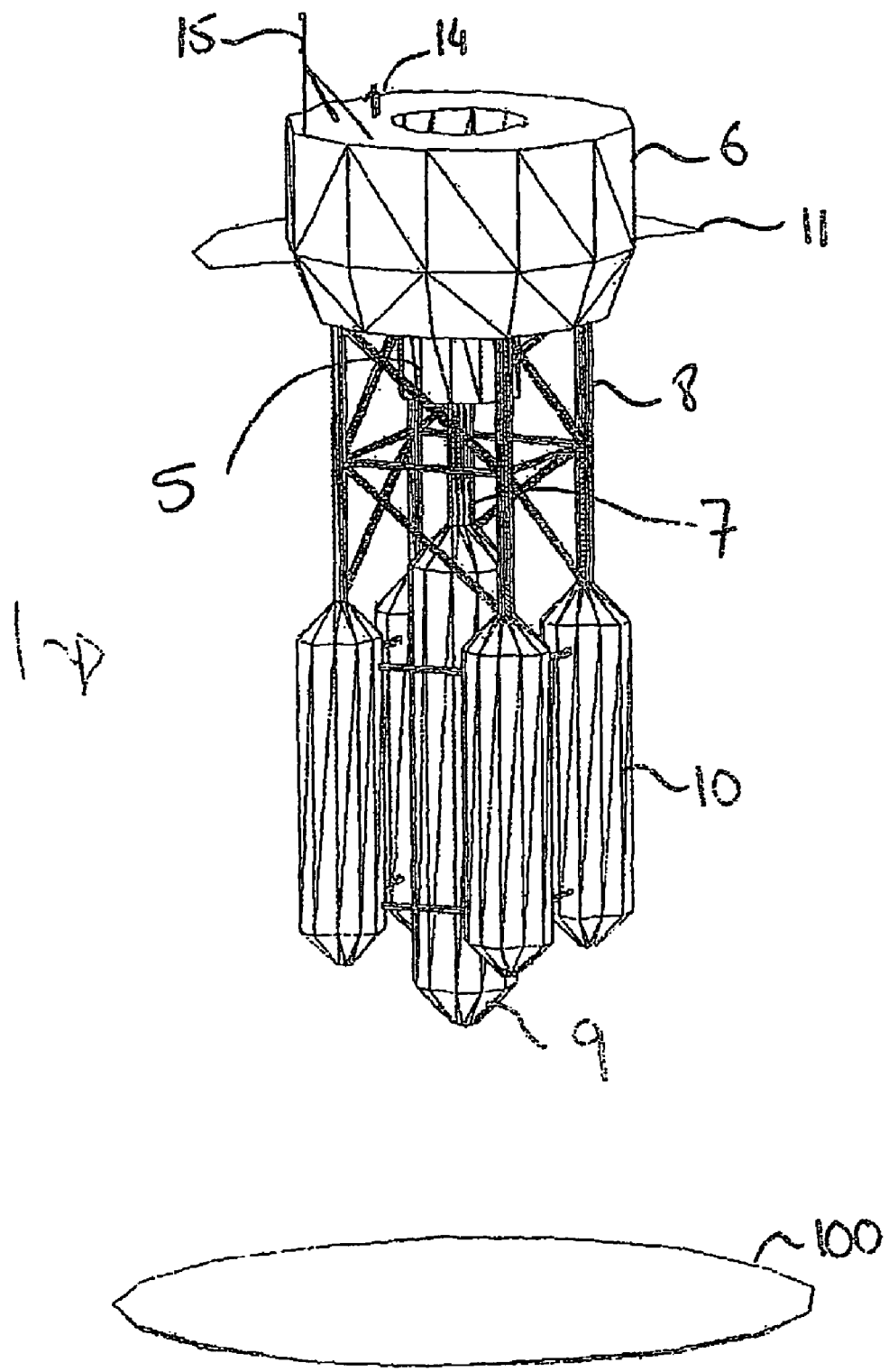
FIG. 3 is a perspective view of a practical embodiment of the present invention.
Figure 4:
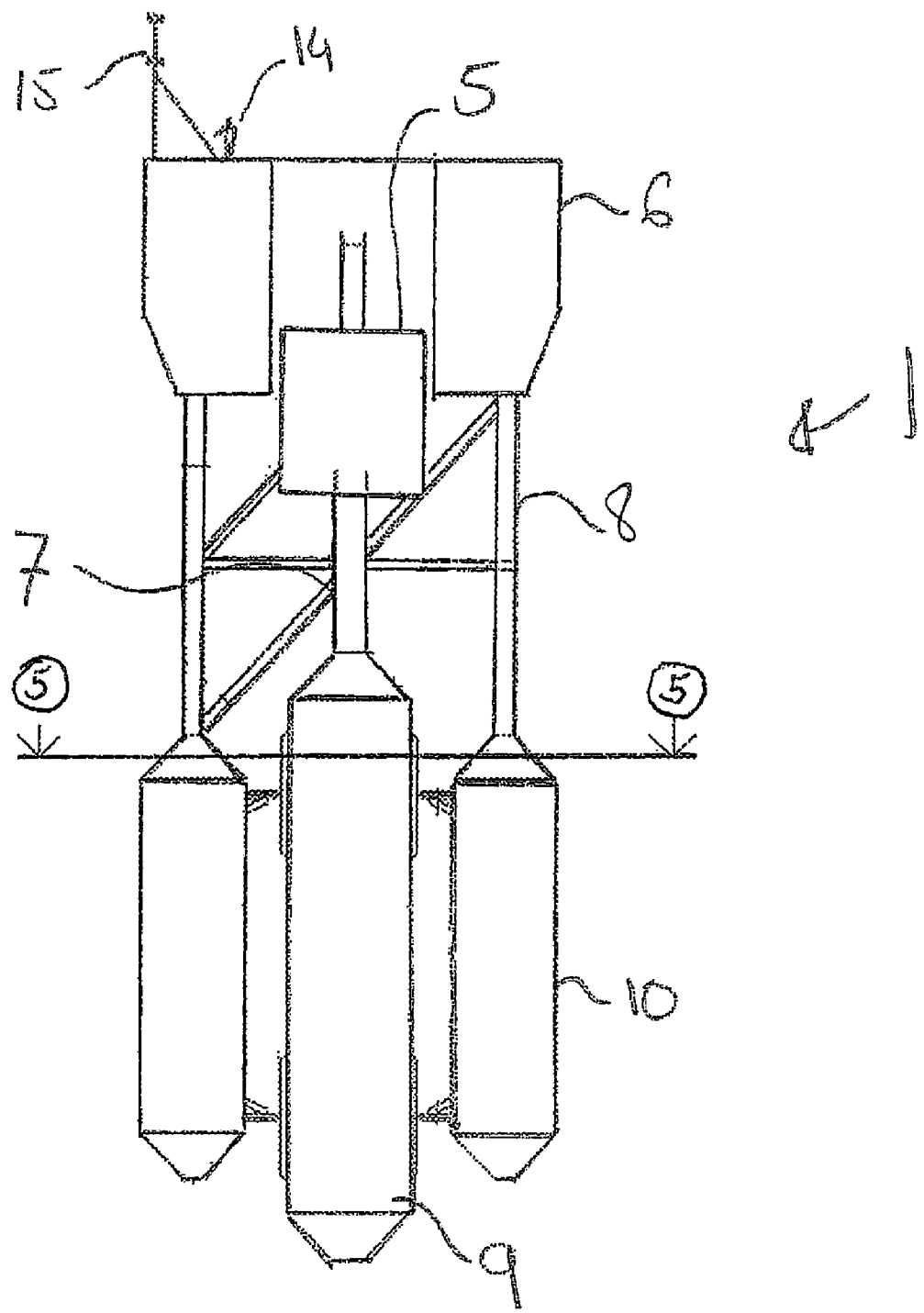
FIG. 4 is a side view of the embodiment illustrated in FIG. 3.
Figure 5:
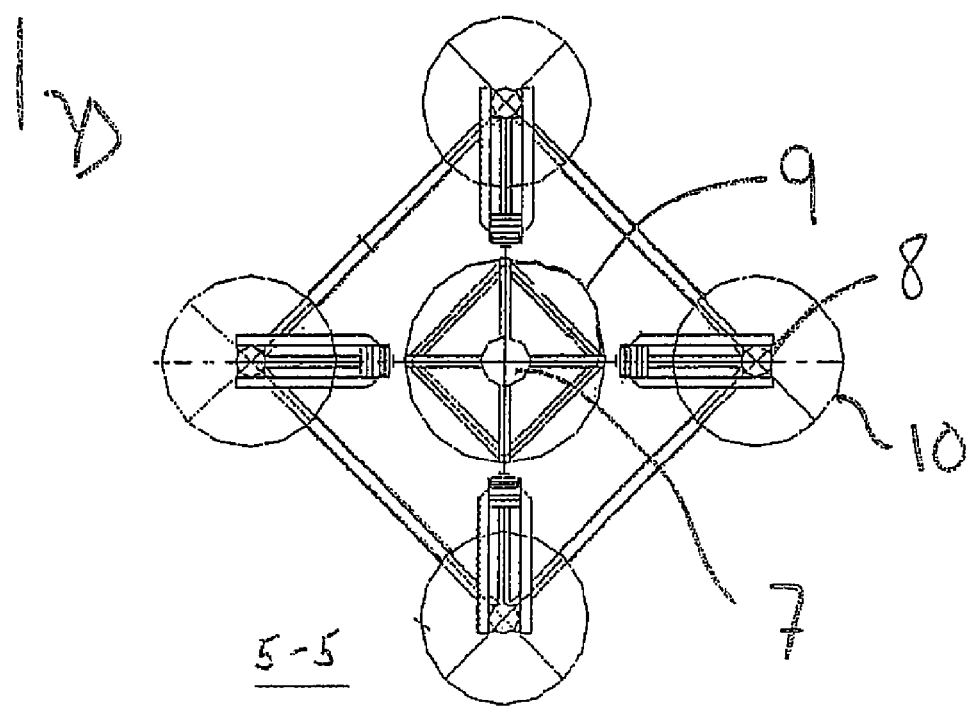
FIG. 5 is a plan section along the line A-A of FIG. 4.

FIGS. 3 to 5 are illustrations of a practical embodiment of the apparatus illustrated in FIG. 1 except that the power take off linkages and covering superstructures are omitted, and a sea-bed 100 is included for reference purposes. The same reference numerals will be used for similar components. FIG. 3 includes a person 14 identified for scale purposes. Due to the large dimensions of the apparatus and the typical deployment in ocean conditions it may additionally comprise navigation lights and radar reflectors 15 to identify it to shipping. As shown in the side view of FIG. 4 and the section (along the line A-A of FIG. 4) of FIG. 5, the outer device comprises a float 6 sinkable to four submerged bodies 10, which in this embodiment are arranged concentrically about a submerged body 9 which is part of the inner device 5.

Figure 6:
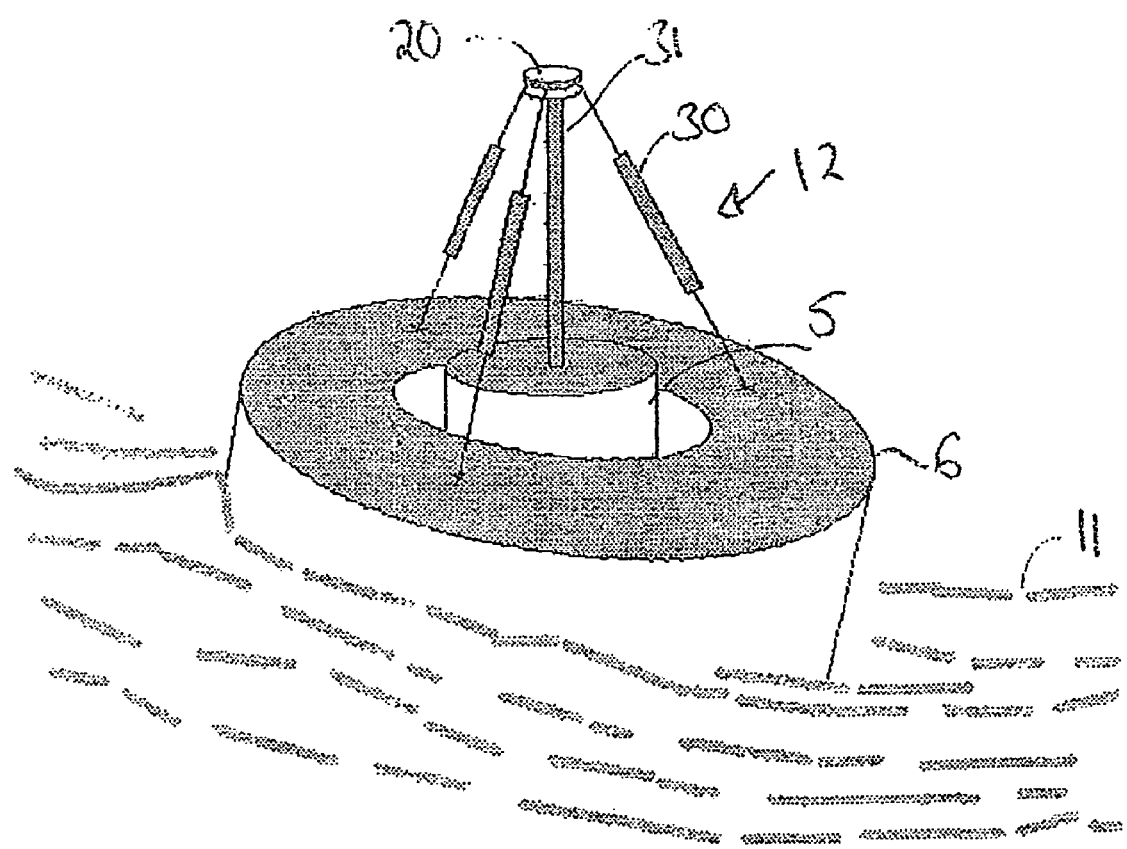
FIG. 6 is a schematic showing a possible arrangement for the power take-off linkages, illustrating possible degrees of freedom in x, y, z and one of rotation.

FIG. 6 is a schematic of a view of an apparatus of the present invention above the surface of the sea. The inner 5 and outer 6 surface floats are evident, as are the power take off linkages 12, maintaining the communication between the inner and outer devices 3, 4. In this illustrated embodiment the linkages 12 incorporate hydraulic cylinders 30 and are connectable to a central shaft 31 rigidly connected to the inner oscillating unit. This arrangement of pistons will allow three degrees of freedom of movement between the two oscillating devices 5, 6; power may be collected, via movements in the hydraulic cylinders 30, from pitching and rolling as well as from vertical heaving. A further degree of freedom is allowed by the pistons being connected to the central shaft 31 via a rotatable collar member 20, which is adapted to allow the outer device to rotate completely about the inner device. Although such rotation does not actively effect changes in energy it enhances the seaworthiness of the entire apparatus in conditions where relative slewing of the connected devices may arise. The freedom to rotate ensures that such slewing will not disable or break the linkages between the inner and outer devices. Although described with reference to a device wherein the linkages 12 are positioned above the surface floats 5, 6 it will be appreciated by the skilled person that there are suitable alternative arrangements that will allow power to be collected from a relative movement between two or more bodies, and allows degrees of freedom between the two or more bodies.

Figure 7:
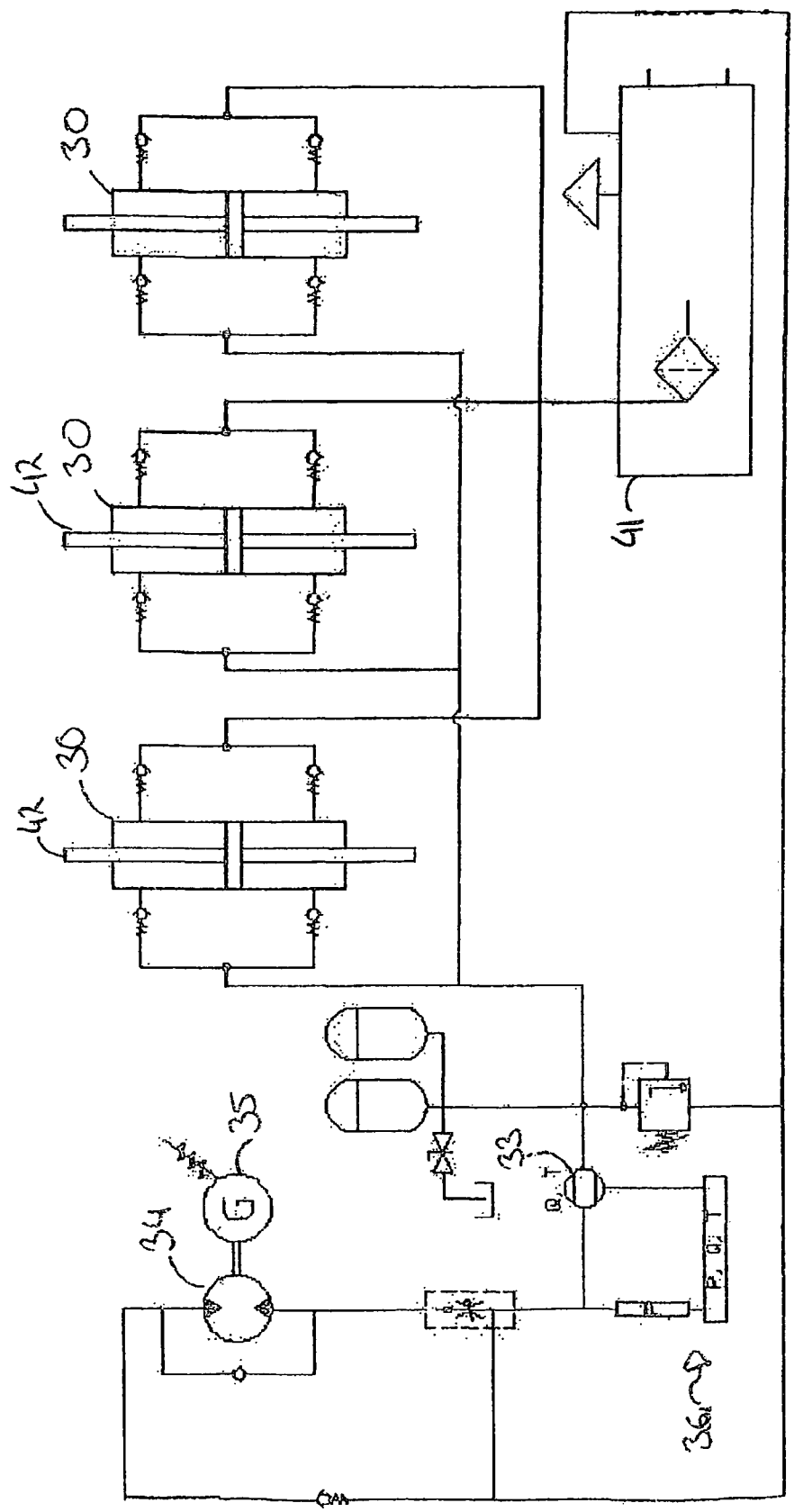
FIG. 7 is a schematic illustrating a power take off circuit for use with the present invention.

The hydraulic linkages 12 of the present invention are typically of the type known in the art as heave compensators or double acting actuators. The incorporation of such actuators into a power take-off arrangement is illustrated in FIG. 7, which describes a system for the conversion of the relative movement of the two devices into electricity. It will be appreciated by those skilled in the art that this power take-off arrangement is illustrative of the type that may be used and is not intended to restrict the invention to such an arrangement. As shown in FIG. 7, two or more actuators 30 are mechanically linked to a pressurised hydraulic accumulator or reservoir 41, and the movement of pistons 42 through the actuator drives fluid from the reservoir 41 through flow turbines 33 to drive a hydraulic gear pump 34. This in turn is adapted to power an electric alternator 35. By provision of a flow computer 36, or other suitable arrangement, it is possible to control the generation of power from the actuators 30.

Figure 8:
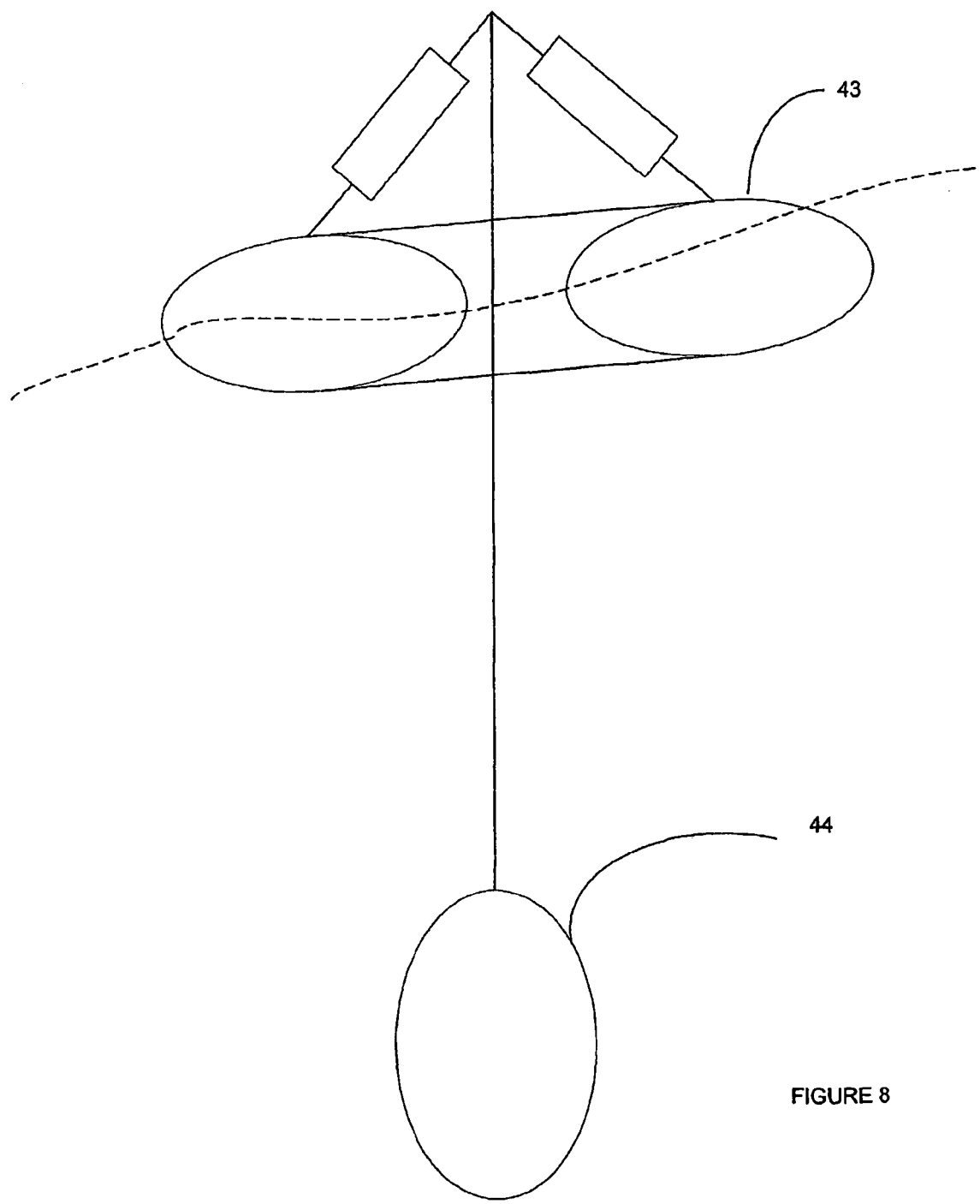
FIG. 8 is a schematic illustrating an alternative embodiment of the apparatus of the present invention equating to a conventional point absorber but incorporating a virtual mass.

Heretofore the invention has been described by means of an apparatus comprising two point absorber devices each capable of independent oscillation. FIG. 8 illustrates an alternative embodiment that corresponds to a single point absorber with a moving float 43 reacting against a deeply submerged virtual mass 44.

Mode of Operation.

As described above, the apparatus of the present invention preferably derives its power from the relative motion of the two (or more) devices 3, 4 each comprising a float of fixed buoyancy 5, 6 on the surface 11 of the liquid 2 rigidly connected to one or more deeply submerged rigid vessels 9, 10.

Each surface float 5,6 tends to act as a heaving buoy as surface waves pass under it and its vertical rising and sinking movements are impeded by it being rigidly connected to one or more deeply submerged vessels 9, 10 of substantial virtual mass. Each combination of surface float plus attached submerged vessel, as a vertically floating structure, will have its own natural frequency of oscillation along its vertical axis and which can be adjusted by appropriate design and control; each device being stable about a vertical position.

Each combination of surface float plus submerged vessel(s) is driven by forces caused by the passing waves. These excitations force consist of:
(a) a hydrostatic term (proportional to the instant value of the wave height)
(b) a dynamic component (proportional to the instant liquid acceleration within the wave)
(c) a diffraction force.

The latter two act to reduce the magnitude of the excitation force. The effect of the dynamic component is proportional to the volume of the submerged body 9, 10 and the submerged part of the surface float; because this effect diminishes with depth it is desirable therefore to place the submerged body 9, 10 at a depth sufficient to optimise design and efficiency of operation. The diffraction force is a function of the added mass of the submerged part of the surface float 5, 6. Therefore, in ideal situations, it is desirable to minimise the draught of the submerged float 5, 6, i.e. to minimise the dead weight of each combination of float plus submerged vessel.

The device as a whole will typically also lose energy because of:
(d) radiated waves;
(e) hydraulic drag;
(f) effects of moorings and umbilicals.

The negative effect of (d) and (e) may be minimised by appropriate hydrodynamic design; the effect is (f) is, desirably small with respect to the main excitation forces and is in turn minimised by good design and small overall aspect to; lateral forces from wind and wave action and currents. Slack or buoyed reduced weight moorings may be appropriate.

Suitably, by appropriate sizing and design, the natural frequency along the vertical axis of each combination of float and submerged vessel(s) may be designed to be close to that of the dominant wave frequency, thus providing the best chance for resonance to occur in the absence of a phase control system.

The control systems may be optimised to enable the oscillations of the apparatus to be adjusted to match the prevailing wave period so that resonance may occur over a range of wave periods. In order to effect this, it will be necessary to design the basic apparatus such that its natural frequency will be higher (or its period shorter) than that of the majority of the waves; the control systems may then be used to slow this frequency, so that the phase velocity of the apparatus and that of the wave are matched and that the amplitude of oscillation tends towards an optimum for maximum useful power for the conditions.

In heavy seas, but not necessarily destructively extreme seas, such phase control and or latching will enable useful power to be recovered and efficient performance maintained even though the amplitude of oscillation would otherwise exceed the design limits of the hydraulics ('stroke out').

An apparatus designed to have a natural frequency at the lower end of a selected range of wave periods and substantially less that the most common period means that that apparatus will be smaller than one designed to match the most common period. This has the additional benefits of lowering the capital cost of the apparatus and of its moorings and also of reducing the risk of loss in extreme seas.

It is also possible to adjust the natural frequency of each combination of surface float and submerged vessel(s) by adjusting the volume of fluid entrapped by the submerged vessel(s) by, for example, causing valves to open at the top and bottom of narrow vertical chambers within each or any one submerged vessel.

In order to implement a suitable control system it is necessary to be able to predict and take appropriate action for the immediately anticipated wave and also to adjust the device to take account of longer-term trends. A wave prediction model may be incorporated in the software as will a memory function and data logging. The control system parameters may be altered remotely, including adjustments based on historical performance, weather forecasts, remotely sensed data, and storm alerts.

Thus the relative motion of the two devices 3, 4 each comprising surface float 5, 6 and submerged vessel(s) 9, 10 and a phase control system may be adjusted to be close to a resonance condition over a selected range of wave periods. The magnitude of oscillation tends to a maximum close to resonance; the preferred embodiment of the device takes advantage of the rapid change in phase shift close to resonance when adjusting parameters of the oscillating bodies. By this tactic a pair of devices, each comprising float and submerged vessel(s), may have a significant difference in phase shift with respect to that of the incident.

The difference in phase shift between a pair of linked devices may be exploited as a source of power by means of some suitable system of mechanical links or by electrical induction. It is to be noted that the amplitude of the relative motion between the two devices is at all times less than the amplitude that might be expected from a single device either following a wave or in resonance with a series of waves. This feature greatly reduces the incidence of amplitude exceeding the design limits of the hydraulic cylinders ('stroke out') and facilitates the use of hydraulic cylinders of shorter stroke and hence lower capital costs.

Theoretical analysis has shown that this apparatus, effectively a combination of two oscillating devices each a point absorber, is capable of absorbing significantly more power from a passing wave than can a single point absorber. In order to achieve these higher efficiencies it is necessary to carefully select the correct proportions for the surface floats and their respective draughts.

In the alternative form of the apparatus, illustrated in FIG. 8, the apparatus comprises a single surface-piercing float and a deeply suspended virtual mass linked by means of the power take-off similar to that already described. In this embodiment the amount of power that may be recovered from the passing waves may approach the theoretical limit for a simple point absorber, i.e. from the wavelength divided by $2\pi$. However the incorporation of a large virtual mass, a feature of this present invention, facilitates the design of a simple and low-cost apparatus with a large installed capacity well matched to long-wave length and powerful ocean swell and suitable for offshore conditions. This embodiment has the additional advantage of allowing a greater amount of power to be absorbed from the pitching and lateral motion of the surface float as it is not inhibited by rigid attachment to a deeply suspended vessel.

Preferably said means for converting resulting forces or changes in forces in the apparatus to useful energy may be selected from one or more of the following:

(a) a hydraulic system (b) a pneumatic system (c) a mechanical system (d) a piezo-electric system (e) an electrical system Preferably said means for converting said forces or changing forces in the apparatus converts said change to an output device which is selected from one or more of the following:

(a) an electricity generating device (b) a device for the hydrolysis of water (c) a pumping device (d) a device for making potable water (e) a device for extracting dissolved salts (f) a hydraulic device (g) a mechanical device The output device preferably generates power in a cyclical manner and the apparatus may optionally further comprise means whereby power can be taken out of the system during one part of a cycle and put back into the system during another part of the cycle.

The combination of two or more converters in an array will provide opportunity to share costs associated with the power take off systems and also improvements in the continuity and supply of power.

In any of the aforementioned described embodiments the hydraulic cylinder, accumulator and motor generator may be accommodated in an 'engine room', preferentially capable of being detached for maintenance purposes.

The device, in any marine embodiment, is intended to be located away from the shoreline and outside the zone of impacting breaking waves. This will result in a more constant generation of power than other devices. The floating vessels 5, 6 will preferably be hermetically sealed, partitioned internally, and will have minimal resistance to breaking seas or very large waves. It may readily be designed such that exceptionally steep waves or breaking seas will pass over it, a form of hydrostatic clipping.

With phase control systems, wave prediction, and being axi-symmetric, the wave energy converter 1 will continue to perform effectively in irregular seas, a condition that is more usual than regular monochromatic wave forms. Very frequently the waves are the result of two or more patterns superimposed, with perhaps an underlying long wavelength swell where the chosen site is open to the ocean and prevailing wind directions. The design imperative is to obtain useful power at low cost, i.e. to optimise the unit cost of power delivered, rather than to seek to achieve the conversion of the maximum amount of the available wave power.

The apparatus of the present invention utilises simple and robust components and systems. As such it is possible to maximise availability and simplify maintenance of deployed power conversion devices, which may deployed singularly or in large arrays. These arrays may be arrays of individually moored wave energy converters, which is typically the preferred arrangement for seas with predominantly long wavelengths. Alternatively, the oscillating unit of float and rigidly linked submerged virtual mass may be deployed in a floating and rigid open framework of adjoining cells, an arrangement that may suit shallower and more sheltered seas with generally shorter wavelengths. Such arrangements in arrays may allow the sharing of a common functionality between several devices.

The devices are designed be independent of tidal changes in mean sea levels, have minimum dependence on wave direction, and maximise the return from long wavelength ocean swell.

By utilising the advantages offered by totally or partially submerged devices it is possible to move out beyond the shoreline and the breaking wave zone and generate of the order of 0.5 MW to 1 MW or more per device in a suitable wave climate.

This approach represents a highly efficient converter of wave energy and improvement on previous devices in that:

- the use of submerged vessels having inertial mass as high as desired and gravitational mass (net buoyancy) as low as desired permits the self-reacting 'heaving buoy' point absorber to approach an ideal mass-spring arrangement and to be far more powerful than was hitherto considered possible
- the use of streamlined inertial masses avoids inefficiencies and energy losses due to drag and vortex shedding associated with inertial plates either alone or in accelerator tubes.
- by extracting power from the relative motion of two coupled devices the stroke length is much reduced, even at resonance, and hence the losses associated with stroke-out reduced and or larger seas may usefully be exploited
- phase control, either continuous or intermittent ('latching'), allows the use of smaller devices operating close to resonance across a range of wave periods.
- all submerged elements are simple fabricated components,
- power take-off and control apparatus may be located within the surface floats,
- the apparatus may be fabricated in a dry dock and towed to the selected site,
- the apparatus is floating and self-reacting and independent of tidal differences,
- it is well suited to the demanding offshore conditions.

The combination of a submerged variable buoyancy and a deeply suspended gravitational mass, as in our corresponding international application WO 99/28623 could be considered as a single very large virtual mass with high gravitational mass, but with little or almost neutral buoyancy effected by an associated submerged buoyancy. In this way an ideal mass-spring arrangement is provided, something that had heretofore not been realised as possible for a floating wave energy converter. By suitable design of the submerged components any losses due to drag may be minimised. In this present invention, this combination of submerged buoyancy and large inertial mass is replaced by a closed vessel of small intrinsic mass, but entrapping a large and therefore massive volume of water, thereby acting as a large inertial mass. The combination of surface float and large deeply suspended virtual mass may be tuned to the prevailing wave climate, facilitating resonance across a range of wave periods, an important property if maximum power absorption is to be achieved. The use of hydraulic power take-off systems facilitates the incorporation of suitable forms of phase control.

By closely combining two such devices separately tuned, a relatively large phase shift may be achieved.

Further improvements are effected by ensuring that all the submerged vessels and assemblies are streamlined and finished to minimise drag and the spaces between the two or more oscillating and connected devices is kept sufficiently great to make shear forces insignificant (a gap of about 1 metre in ocean conditions).

This solution is unlike any previously described self-reacting heaving buoy point absorber in two ways,

- it incorporates a relatively very large inertial and associated added mass as a single virtual mass to react against, and secondly
- it is preferably a combination of two oscillators that may be differentially tuned to allow maximum phase shift in all of which power is taken off from their relative movement.

It is further enhanced by being capable of collecting useful power from relative motions between the connected devices other than the vertical mode.

The invention claimed is:

1. A point absorber wave energy conversion apparatus (1) for harnessing energy from wave motion on the surface of a body of liquid (2) and having dimensions small with respect to the wavelength of the predominant wave, the apparatus comprising:
    a) at least two devices (3, 4, 43, 44), a first device comprising a surface float (5, 6, 43) and a second device comprising at least one submerged body (9,10, 44) below the surface of the body of liquid,
    b) linkages (12) between the at least two devices,
    wherein the at least two devices are adapted to move relative to one another in response to passing waves, and the relative movement between the at least two devices effects an energy transfer which is harnessed by the linkages between the at least two devices, and wherein the at least one submerged body comprises a compartment to entrap volumes of the surrounding liquid within the at least one submerged body or may alternatively or also in part entrap or contain airspaces or buoyancy devices so as to adjust the natural frequency of each combination of surface float and submerged body to enable a tuning of the apparatus.

2. The apparatus as claimed in claim 1 wherein the devices are of a size and weight sufficient to ensure that the surface floats remain partially submerged in the water under normal wave or swell conditions.

3. The apparatus as claimed in claim 1 wherein the overall mass, virtual mass and dimensions of each device comprising the surface float, the at least one submerged body, entrapped liquid and control systems is such that each will tend to have a frequency of oscillation along its vertical axis that is related to the prevailing frequency of the surface wave.

4. The apparatus as claimed in claim 1 further including adjustment means (13, 14) by which the entrapped volume of the at least one submerged body may be adjusted.

5. The apparatus as claimed in claim 4 wherein the adjustment means comprises means for adjusting the volume of liquid entrapped in the submerged vessel.

6. The apparatus as claimed in claim 1 wherein the apparatus includes control systems and/or control systems linked to probes or detectors and adapted to tune the oscillating device to match prevailing wave periods by one or more of the following:
    a) by adjusting the virtual masses and/or
    b) to effect latching or phase control mechanisms intended to maintain oscillation close to resonance during changing conditions and/or
    c) to hydraulically or otherwise lock or otherwise secure the apparatus during maintenance or storm conditions.

7. The apparatus as claimed in claim 1 wherein the linkages are adapted to allow several degrees of freedom and at the same time collect useful power from lateral, pitching and heaving relative movements.

8. The apparatus as claimed in claim 1 further comprising mooring systems adapted to maintain the complete apparatus in a substantially stationary position relative to a fixed location.

9. The apparatus as claimed in claim 1 wherein at least a portion of the linkages are formed by an air-spring or mechanical spring enabling the connection between the at least two bodies to be adjusted in accordance with the oscillation of either body.

10. The apparatus as claimed in claim 1 wherein the at least one submerged body is streamlined so as to reduce drag.

11. The apparatus as claimed in claim 1 wherein the first device further comprises at least a first device submerged body rigidly connected to the surface float and the second device further comprises at least a second surface float rigidly connected to the at least one submerged body.

12. The apparatus as claimed in claim 1 wherein the at least one submerged body is submerged at a depth below the surface that is related to the length of the prevailing wavelengths of wave or swell in the body of liquid.

* * * * *